United States Patent [19]
Rieck

[11] Patent Number: 6,064,034
[45] Date of Patent: May 16, 2000

[54] LASER MARKING PROCESS FOR VITRIFICATION OF BRICKS AND OTHER VITRESCENT OBJECTS

[75] Inventor: Albert S. Rieck, Riviera Beach, Fla.

[73] Assignee: Anolaze Corporation, Fla.

[21] Appl. No.: 09/272,072

[22] Filed: Mar. 18, 1999

Related U.S. Application Data

[63] Continuation-in-part of application No. 08/754,969, Nov. 22, 1996, abandoned.

[51] Int. Cl.[7] .............................. B23K 26/10; B23K 26/12
[52] U.S. Cl. .................................. 219/121.85; 219/121.84
[58] Field of Search ............................ 219/121.6, 121.66, 219/121.68, 121.69, 121.78, 121.84, 121.85, 121.61; 65/33.2; 347/225, 260

[56] References Cited

U.S. PATENT DOCUMENTS

| | | | |
|---|---|---|---|
| 4,476,154 | 10/1984 | Iesaka et al. | 437/229 |
| 5,427,825 | 6/1995 | Murnick | 427/555 |
| 5,554,335 | 9/1996 | Fields et al. | 219/121.66 X |

FOREIGN PATENT DOCUMENTS

| | | |
|---|---|---|
| 60-199660 | 10/1985 | Japan . |
| 2-279574 | 11/1990 | Japan . |
| 7-116869 | 5/1995 | Japan . |
| 7-269130 | 10/1995 | Japan . |
| 2056640 | 3/1981 | United Kingdom . |
| 95/35269 | 12/1995 | WIPO . |

*Primary Examiner*—Gregory Mills
*Attorney, Agent, or Firm*—McHale & Slavin, PA

[57] ABSTRACT

A laser marking system for vitrification of a brick, tile, paver, or pot. A laser such as a continuous wave Nd:Yag or carbon dioxide unit is configured for optimized vitrescence of an object placed in the path of the beam. The beam is steered via computer controlled motors attached to reflecting mirrors located in the path of the beam. Graphical characters and letters can be vitrified into the surface of objects which are placed in the working area of the beam by running computer software for controlling the beam steering mirrors. A laser with adequate vitrification power will then vitrify, or change to glass, the surface of clay-containing objects falling in the path of the laser beam. The width of the beam, temperature and moisture content of the clay-containing object, gaseous atmosphere at the work surface and speed of beam movement can be optimized to maximize the throughput of a laser marking system. The laser marking system might also be mounted on a mobile unit for vitrification of already mounted bricks, pavers, or other such objects.

11 Claims, 5 Drawing Sheets

LASER MARKING PROCESS FOR VITRIFICATION OF BRICKS AND OTHER VITRESCENT OBJECTS

RELATED APPLICATIONS

This application is a continuation-in-part of Ser. No. 08/754,969, filed Nov. 22, 1996, and now abandoned; the contents of which is herein incorporated by reference.

FIELD OF INVENTION

This invention relates to a laser marking process whereby a guided continuous wave laser beam is applied to the surface of a vitrescent object such as a clay brick to produce vitrification, or glassification, of the object surface; particularly to a laser marking process utilizing atypical combinations of system parameters; and most particularly to a system and method for laser marking carried out in an altered gaseous environment.

BACKGROUND OF THE INVENTION

Building materials such as bricks, pavers, terra-cotta tiles, or pots, hereafter referred to as "bricks," generally have a high clay content. Such building materials are not fired at extremely high temperatures like glazed ceramics. Instead, articles such as bricks are formed at temperatures sufficient to harden them for building. As a result, bricks are generally softer than ceramics or other clay products formed at high temperatures, but they also are not as brittle and therefore are deemed more suitable for general building purposes.

The use of brick as a building material dates back centuries. Because of brick's enduring qualities and limitless appearances, designers have depended on them to achieve virtually any desired style or expression. Bricks can be formed from a variety of clay-based materials and can come in a variety of colors and sizes. Clay is one of earth's most abundant mineral materials, however all clays are not suitable for brick manufacture. Clay for the production of brick must possess specific properties and characteristics in order to satisfy modern production requirements. For example, clays must have plasticity, which permits them to be shaped or molded when mixed with water; and they must have sufficient wet and air dried tensile strength to maintain their shape after forming. Also, when subjected to rising temperatures, the clay particles must fuse together. There are many variables in the manufacturing of clay and shale masonry units. Primary raw materials include surface clays, fire clays, shales or combinations of these. They must be plastic when sufficiently wetted, rigid when dried and vitrified when fired to a sufficiently high temperature. Units are formed by extrusion, molding or dry-pressing and are fired in a kiln at temperatures between 1800° F. and 2100° F. (980° C. and 1150° C.). These variables in manufacturing produce units with a wide range of colors, textures, sizes and physical properties. Naturally occurring clays are divided into specific types having particular properties. For example, clay is defined as a natural, mineral aggregate consisting essentially of hydrous aluminum silicate. It is a product of decomposition and alteration of feldspathic rocks and contains a mixture of particles of different sizes and widely differing physical, chemical and mineralogical properties. The non-plastic portion consists of altered and unaltered rock particles of which the most common and abundant substances are quartz, micas, feldspars, iron oxides, and calcium and magnesium carbonates. Organic matter usually is present in greater or lesser amounts, and frequently plays an important role in determining clay properties. The essential constituents of clays are hydrated silicates of aluminum, of which there are several, but the most important and widespread are the kaolinite group, $Al_2O_3$—$(SiO_2)_2$—$(H_2O)_2$ and montmorillonite group, $(Mg,Ca)O$—$Al_2O_3$—$(SiO_2)_5$ The typical clay minerals—kaolinite, montmorillonite, etc., have microscopic plate-like structures which are believed to be chiefly responsible for their plasticity (formability) when wetted with water. Other important properties are: (1) hardening when dried and permanency when fired; (2) shrinkage during drying and firing; (3) the variety of colors obtainable when fired; (4) refractoriness, or resistance to softening at high temperatures; and (5) heat, sound and electrical insulation. The fineness of a clay's grain influences not only its elasticity but also such properties as drying performance, shrinkage, warping, strength and quality of marking achievable by laser energy. Clay's with high aggregate contents, sands and organic matter are prone to poor glassy vitrification by laser energy. Clays occur in three principal forms, all of which have similar chemical compositions but different physical characteristics. Surface clays may be the upthrusts of older deposits or of more recent, sedimentary formation. As the name implies, they are found near the surface of the earth. Shales are clays that have been subjected to high pressures until they have hardened almost to the form of slate. Fire clays are usually mined at deeper levels than other clays and have refractory qualities. As a rule, they contain fewer impurities than shales or surface clays and have more uniform chemical and physical properties. Clays are complex materials; surface clays and fire clays differ from shales more in physical structure than in chemical composition. Chemically, all three are compounds of silica and alumina with varying amounts of metallic oxides and other impurities.

Although technically metallic oxides are impurities, they act as fluxes, promoting fusion at lower temperatures. Metallic oxides (particularly those of iron, magnesium and calcium) influence the color of the finished fired product. The brick manufacturer minimizes variations in chemical composition and physical properties by mixing clays from different locations in the pit and from different sources. However, because clay products have a relatively low selling price, it is not economically feasible to refine clays to produce uniform raw materials. Since variations in properties of raw materials must be compensated for by varying manufacturing processes, properties of finished products from different manufacturers will also vary somewhat. The widespread usage of bricks as a building material on highly visible areas such as walkways and building fronts has led artisans to attempt to etch and decorate such materials with letters and/or graphical patterns. A common form of etching includes sandblasting the surface of the brick. Sandblasting leaves a particulate residue over the etched surface and surrounding work area. Airborne particles used in this process, such as sand and/or aluminum oxide, are known to cause irritation or carcinogenic reactions in workers and other persons passing through the area. Moreover, a mask for placement over the area to be blasted must be formed and cut. The blasted area must often be painted thereafter so that a noticeable color change will occur between the surface and the cut. Yet another method of etching includes pantograph engraving which uses a computer controlled cutting blade or bit to form channels in the surface of the object to be etched, with similar painting of the cuts thereafter.

In either instance, the surface of the brick is chipped or blasted away by the force of the sand which thereby leaves etched channels in the surface. When used to construct walkways and buildings, such channels in the bricks can collect dirt wherein the etched pattern is not readily discernable. Moreover, the sharp edges of inner "islands" of material, for instance the island formed by channeling the letter "e", are susceptible to breakage. This could render any artwork or lettering unreadable. Repair and replacement of the brick is expensive due to the way a brick is installed namely via mortar or cement attachment.

It is known that glass can be formed by melting or fusing materials under extremely high temperatures by a process called vitrification. It is also known that lasers produce intensely focused beams of light at specific wavelengths which results in localized heating of an object which falls in the path of the active beam. Laser light can be produced and amplified by a variety of sources including, for example, Nd:YAG lasers produce laser light at a principal wavelength of 1064 nanometers (nm). Nd:YAG lasers can be operated as a continuous wave (CW) laser or with pulse or frequency modification. In the latter instance, a Q-switch is used to reflect the laser beam back into the lasing chamber to build up more power before the beam is released. The result is a pulsed laser with each pulse being more intense than a continuous wave beam from the same laser unit. Other lasers, such as carbon dioxide ($CO_2$), can be constructed and configured for different wavelengths and power outputs.

Laser marking is thereby known in the field but not for the localized vitrification of vitrescent objects such as bricks.

PRIOR ART

U.S. Pat. No. 5,480,308 discloses a method of etching wooden blocks with information about the type of wood and/or tree.

U.S. Pat. No. 5,346,802 discloses a process for laser-marking thermoplastic articles.

U.S. Pat. No. 5,215,864 discloses a method and apparatus for engraving a metal plate in two or more colors by treating oxidized aluminum.

U.S. Pat. No. 5,309,273 discloses a liquid crystal mask for raster scanning a YAG laser beam onto an object surface.

U.S. Pat. No. 5,103,073 discloses a method for irradiation of the surface of an object by laser beams directed to treatment zones having a desired shape, wherein laser beams are subjected to spatial phase modulation dictated by the shape and rotation of the treatment zone and the prescribed distribution of intensity. None of these patents, however, disclose the unique benefits and results of applying a laser to a vitrescent material.

Further art, including U.S. Pat. No. 4,769,310 and 5,030,551 discloses a method for marking ceramic materials, glazes, glass ceramics and other glasses. Ceramic and glass materials have been treated at high temperatures in their formation, and thereby have a glassy surface, or a glaze over their entire surface. Such glassified surfaces are difficult to mark, even with a laser. As a result, the '310 and '551 patents disclose a method of applying a transparent layer of material (e.g. 100 to 10,000 angstroms thick) such as titanium dioxide to the outer surface of the ceramic or glass object, and then irradiating the oxide layer with a pulsed laser beam. The irradiation causes discoloration of the applied oxide layer at the irradiated areas.

Glazed ceramic materials, such as whiteware, often develop regions of cracking due to wear, impacts, thermal stresses and the like. U.S. Pat. No. 5,427,825 discloses a method of repairing such glaze defects by preheating a glaze defect area with radiant energy. The glaze defect area is then treated by applying higher power radiant energy (such as infrared) from a laser to provide localized heating of the glaze material. The surface is further treated with radiant energy at a lower power density so as to limit the rate of cooling of the fusion zone and the immediately surrounding regions. This multi-step process prevents thermal stress cracking during the glaze defect repairing procedure.

U.S. Pat. No. 4,814,575 discloses yet a further method of surface-treating ceramic workpieces using a laser. A $CO_2$ laser directs a beam onto a ceramic workpiece to be treated. A carrier gas injector injects a moderate throughput of spheroidized powder of a ceramic material into the beam. After melting and solidifying, the added layer has microcracks which are smaller than the cracks in the untreated surface. This method is useful in the construction of heat engines.

U.S. Pat. No. 5,554,335 discloses a three stage process for laser vitrification of ceramic materials such as bricks. This process requires an exceedingly long residence time with a concomitant loss of economic efficiency. Additionally, the quality of marking which results from the practice of this invention does not result in a smooth glassy appearance.

International Application WO 95/35269 discloses a method for the laser marking of bricks to produce artistic patterns, signs and symbols on the brick's surface. This application fails to recognize those conditions which must be optimized in order to form a smooth, glassy marking on the brick.

Accordingly, what is needed in the art is an improved method for applying a series of letters and/or graphical pictures to the surface of a brick with a laser. The process should be simple in that it should be performed without additives being applied to the brick to effectuate marking and/or coloration. The process should leave a smooth, glass-like lasting mark on the brick, which does not need further painting or refinement, and which does not form a channel with edges to chip away, collect dirt, and/or trap precipitation (e.g. ice and snow).

SUMMARY OF THE INVENTION

The present invention provides a laser treatment method and process for affecting and changing the surfaces material of a brick. The brick is formed from a clay-based material, which is vitrescent in nature. A vitrescent material is one which can be changed to glass upon application of sufficient heat. The present invention thereby uses a laser to heat specific areas of the surface of the brick vitrify, or glassify, the material at specific locations. A laser beam is made steerable via computer controlled steering mirrors. Programs are then utilized to control the computer which steers the beam in the shape of letters or graphical characters across the face of the brick. The programs are written so that different methods of tracing letters or graphical patterns will optimize the laser beam width and intensity.

Accordingly, a vitrescent object, such as a brick, can be conveniently marked with such things as the name of a person and/or family. Bricks are commonly used for walkways and walls at publicly accessible areas such as sporting arenas, museums, libraries, government buildings and parks. With the laser-marking process of the present invention, the bricks can then be permanently marked with, for instance, the name of a donor for a particular walkway or building project. Alternatively, the bricks might be marked with a graphical pattern, or portion thereof, wherein a larger graphical pattern or scene is formed by adjoining bricks in a construction project.

Prior art systems for brick marking suffered from such problems as shallow markings, bubbling of the vitrescent material, uneven edges and the lack of a smooth and glassy appearance to the mark. These shortcomings resulted from the prior artisans failure to appreciate the effects that such parameters as temperature of the brick, moisture content, beam width and intensity have on the final appearance and durability of the laser-marked areas. The present inventor has discovered that by maintaining brick surface temperature, moisture content and beam width and intensity within particularly defined parameters, a synergistic improvement in the quality and efficiency of the marking process results. Additionally, it has been discovered that even greater improvements in marking quality and efficiency can be achieved by creating an oxygen enriched gaseous layer adjacent the brick's surface during the marking process.

The preferred embodiment employs a Nd:Yag laser with a wavelength of 1064 Angstroms and utilizes a continuous wave (CW) beam rated for at least 60 Watts, a 10 inch or larger objective lens, and a beam telescope or collimator. In other embodiments a vacuum system may be included for removal of gases and debris generated during the vitrification process. In still additional embodiments a stream of oxygen is caused to flow over the surface of the brick during the vitrification process. A range of useful yet affordable powers would include 50–150 watt laser units. The collimator or beam expander, such as those available from Rodenstock Precision Optics, Inc., expands the beam in a range of 2x–8x that of the original beam width emanating from the laser. The present inventor has discovered that modification of the standard collimator so as to produce a beam that is 1.6x to 1.9x will unexpectedly improve the resultant intensity thereby resulting in more efficient marking of objects, particularly in a mass production situation. In a most preferred embodiment, a beam expansion factor in the range of 1.6x–1.9x is utilized with a 254 mm lens. The beam width must also be of an appropriate width so as not interfere with various rail components, and so that the beam properly interacts with the steering mirrors. As mentioned above, a Q-switch might be incorporated inside the Nd:Yag laser to cause a delay between laser pulses. This allows the power of the emitted beam to build up to a greater power density between each pulse. The present invention uses a CW beam because it has been found to produce a smoother marking pattern on the brick surface. It is contemplated that other lasers could also be used, including a $CO_2$ laser which operates at a continuous wavelength of 10,640 Angstroms and a variety of power ranges.

A galvanometer motor is connected to a X-axis rotating mirror and yet another galvanometer motor is connected to a Y-axis rotating mirror. Each mirror is used in conjunction with the other, and with a computer control device, to steer and direct the laser beam in a pattern across the surface of a workpiece. Upon contact of the laser beam with the brick, a portion of the surface vitrifies, or turns to glass. This glass substance can vary in color depending upon the color and type of brick used. For instance, a reddish brick is found to produce a darker or black vitrification. Lighter shades of bricks, including for instance grey and ivory, have been shown to produce more of a greenish vitrification. In each case, the vitrified patterns are easily visible on the surface of the brick. The vitrification area and its appearance might also be varied by changing the laser type, laser configuration, and laser power, along with the brick type.

Furthermore, the glassified surface area is integrally formed into the surrounding material of the brick and cannot be readily worn off. While the lettering or graphical patterns are very visible, little to no channeling occurs in the brick surface to produce such patterns, and the pattern colors are a natural result of the glassification process. The vitrification process is more resistant to freezing or abrasion. For instance, paint or dye applied to the surface of a brick quickly wears off. Sand blasting requires generation of a mask and results in channels which must be painted in order to be readily seen. Such channels quickly fill up with such things as debris, dirt, rain, and/or snow, particularly when the bricks are laid flat and used on a walkway. Such channels can also be worn and "islands" of material can be chipped away. Accordingly, the lettering or patterns become hard to read and the bricks must be frequently cleaned in order to maintain their original appearance and/or artistic purpose.

The vitrification employed by the present invention, thereby creates a localized alteration, or glassification, of the material of the object to be treated. The color and clarity of the laser marking will vary depending on the softness and/or overall clay-content of the object to be treated. Clay is the base material which is altered by the heat of the laser to form glass. As a result, terra cotta, which is very soft and has a high clay-content, marks very well with a 60 Watt Nd:Yag laser. Other objects such as clay pots and pavers experience similar results as dependant upon similar factors.

The laser marking apparatus of the present invention might also be configured to be mobile, with the various components put on a vehicle such as a truck. Such components might include a power supply and coolant for the laser, with a computer for driving the steering mirrors according to entered requests. Fiber optics would allow moveable placement of the marking beam, or marking beam head, over an object surface away from the truck, such as an already mounted brick or paver. Accordingly, persons could pay a fee and have their name or logo vitrified into the surface of the brick or paver, on the spot while they were watching. This mobile system would allow the establishment to generically pave or brick a certain area, such as a walkway or building wall, before actually marking the bricks or pavers. The establishment could then sell, over a period of time, the right for persons to memorialize their name in available bricks or pavers.

It is therefore an objective of the present invention to provide an improved laser marking method for the localized vitrification of vitrescent objects.

It is a further objective of the present invention to provide a uniquely configured beam expansion whereby optimized laser beam width and intensity are achieved.

It is a still further objective of the present invention to provide for the fast and efficient throughput of objects to be marked with the laser marking system.

It is yet another objective of the present invention to provide for programmable lettering or graphical symbols to be vitrified into the surface of vitrescent objects, such as bricks.

It is still another objective of the present invention to provide for programmable optimization of the marking patterns to be used for lettering and graphical symbols.

It is a further object of the present invention to provide a laser marking method and process for the localized vitrification of vitrescent objects, namely bricks, wherein the laser marking system is mobile and can be used on already placed objects.

It is yet still another objective of the instant invention to provide enhanced laser marking of vitrescent objects, namely bricks, by utilizing optimal moisture content and surface temperature of the vitrescent object.

It is an even further objective of the instant invention to provide improvements in the quality and efficiency of laser marking of vitrescent objects by providing an oxygen enriched atmosphere adjacent the object's surface during the marking process.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
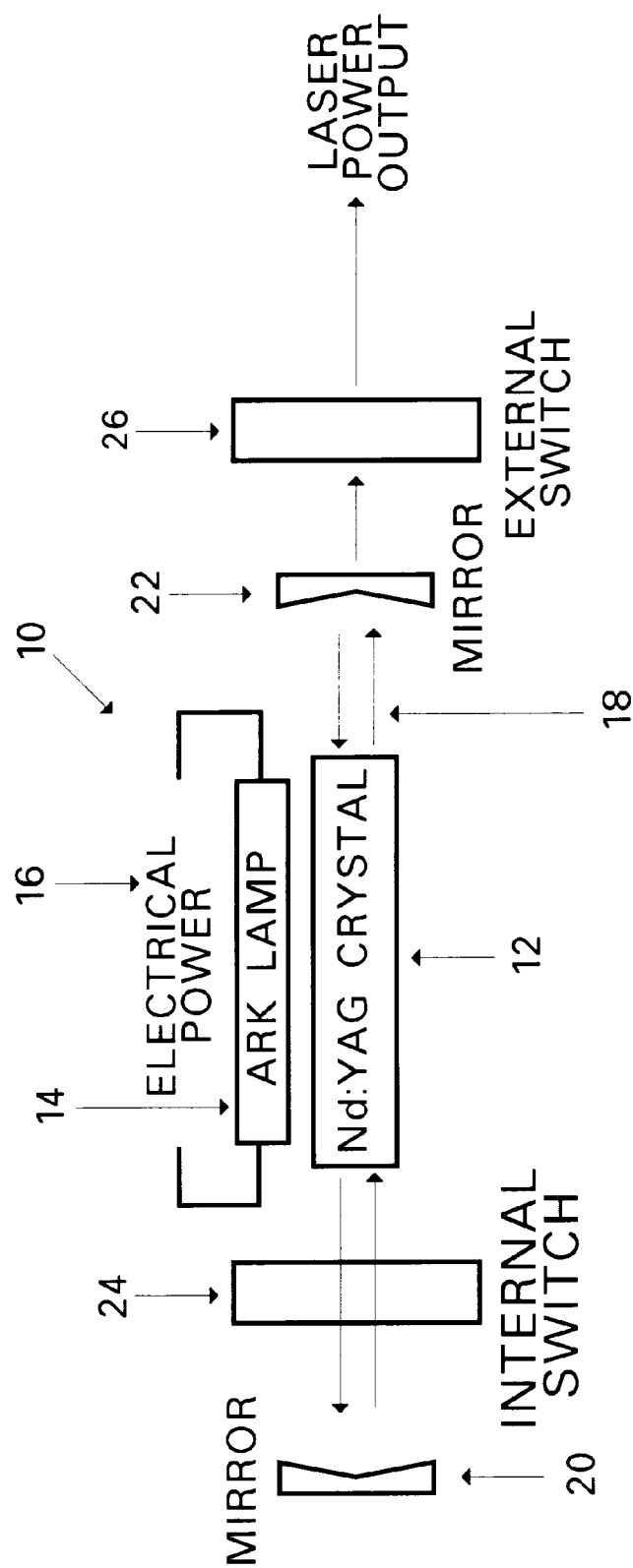
FIG. 1 shows a block diagram of the basic operation of an Nd:Yag laser configuration.

Referring now to FIG. 1, a block diagram of a typical Nd:Yag laser configuration 10 is shown. An Nd:Yag crystal 12 is excited by a krypton arc lamp source 14 which is powered by an electrical source 16. The crystal 12 produces a laser beam 18 which is reflected back and forth through the crystal 12 by a first mirror 20 and second mirror 22. When the beam is powerful enough, it will pass through the second mirror 22 and will be a continuous wave beam. An internal switch 24, or Q-switch, can be used to further reflect the beam 18 back through the crystal 12 until it builds up even more power. This produces a pulsed, or discontinuous beam, with each pulse having relatively more power than a continuous beam. An external switch 26 allows the beam, pulsed or continuous, to exit the laser for application to the work surface. In the present invention, a continuous wave beam has been found to have sufficient power to quickly mark the surface of the vitrescent object. The continuous wave beam is also preferable because it produces a smoother mark due to its, non-pulsing action upon the surface of the vitrescent object.

Figure 2:
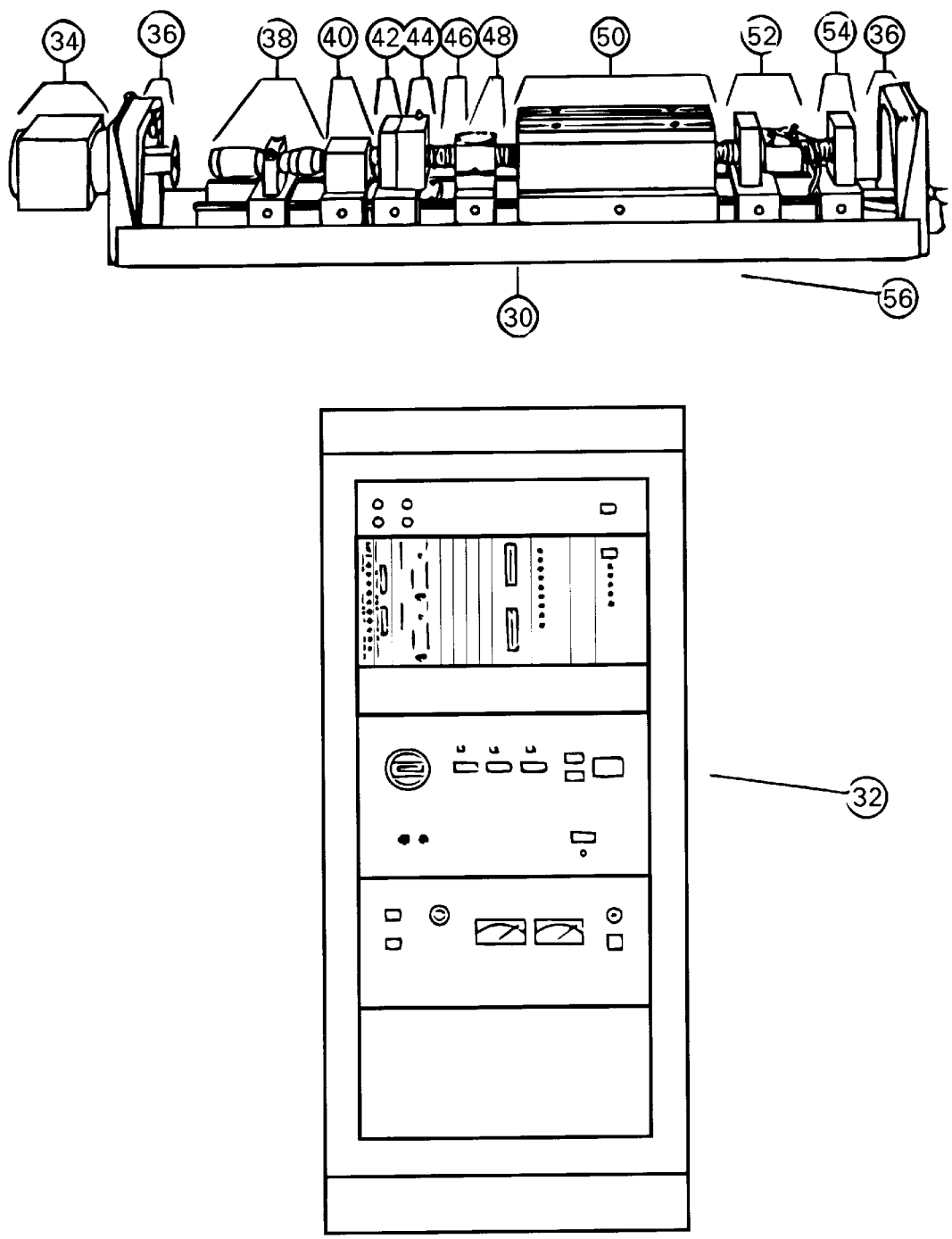
FIG. 2 shows a perspective view of laser rail setup and a front view of an associated controller.

Referring now to FIG. 2, a laser rail setup 30 is shown, with a typical controller 32. The preferred embodiment uses an Nd:Yag laser, such as that manufactured by AB LASERS. This laser uses a computer based system which guides and controls the laser. The components include galvanometer lens assembly 34, a pair of safety interlock switches 36, a beam expander or upcollimator 38, a photo diode or power sensor 40, an output coupler or front mirror 42, a safety shutter or fail safe 44, an aperture mount 46, a rotary shutter 48, a laser head 50, a rear mirror 52, and a laser rail enclosure 56. The present invention is not limited, however, to this particular manufacturer or model or specific configuration.

Figure 3:
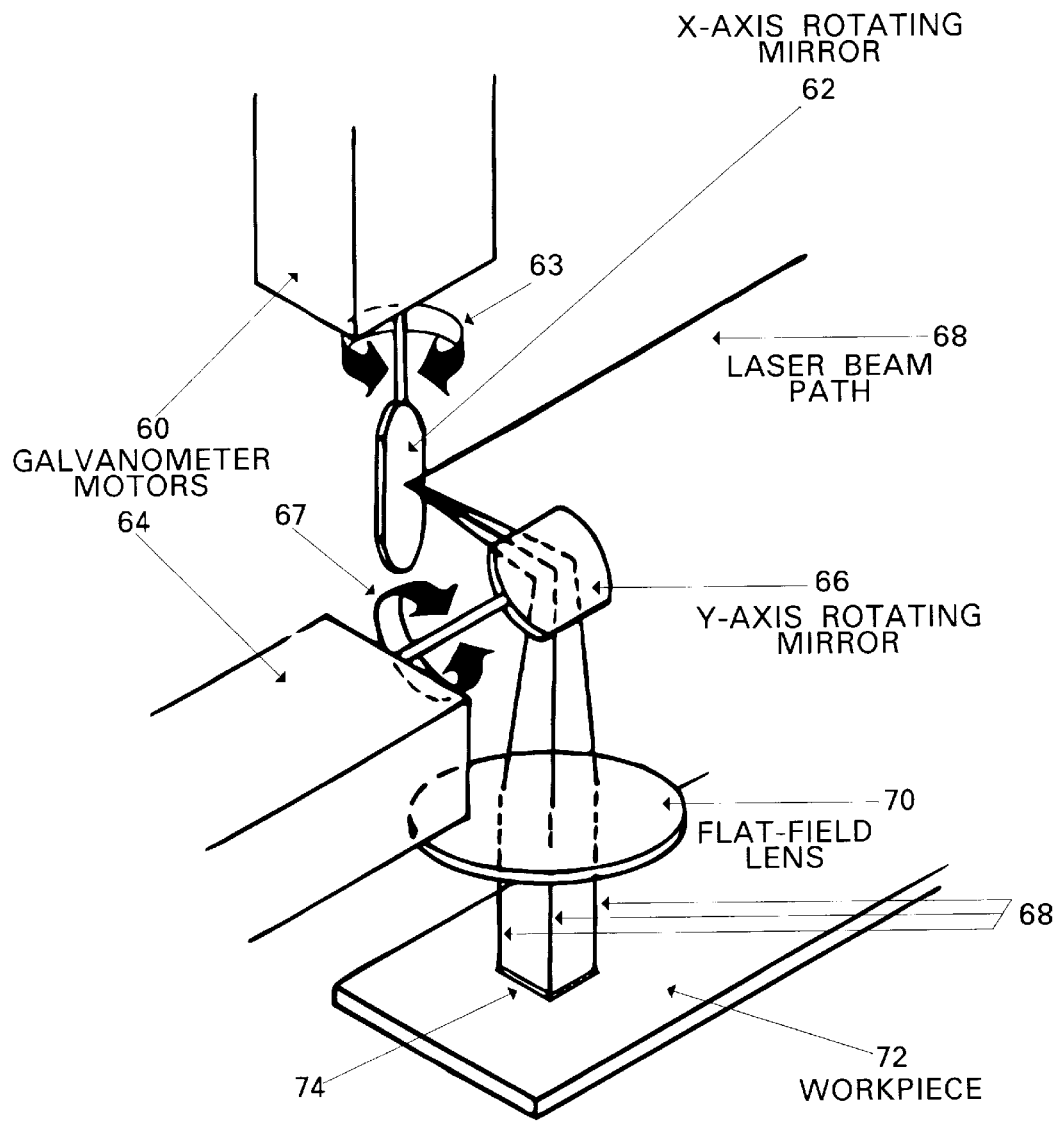
FIG. 3 shows a perspective view of the galvanometer motors and associated rotating mirrors for steering the laser beam.

Referring now to FIG. 3, a perspective view of the beam steering mechanism is shown. A first galvanometer motor 60 is connected to the X-axis rotating mirror 62. The second galvanometer motor 64 is connected to the Y-axis rotating mirror 66. The mirrors are rotated about their respective axes as shown by the arrows 63 and 67, in a coordinated fashion so as to cause the beam 68 to sweep over a flat field lens 70 and onto the workpiece, or brick 72. The beam 63 is thereby directed to form patterns or, for instance, a letter "L" 74 as shown. The controlling software moves the beam at a pace whereby vitrification of the brick 72 occurs, yet damage does not result to the brick 72. A useful range of beam speeds includes, but is not limited to 20 mm/sec–75 mm/sec. The vitrification pace is also generally optimized to be fast enough to generate a profitable throughput of objects to be marked with the laser.

Figure 3A:
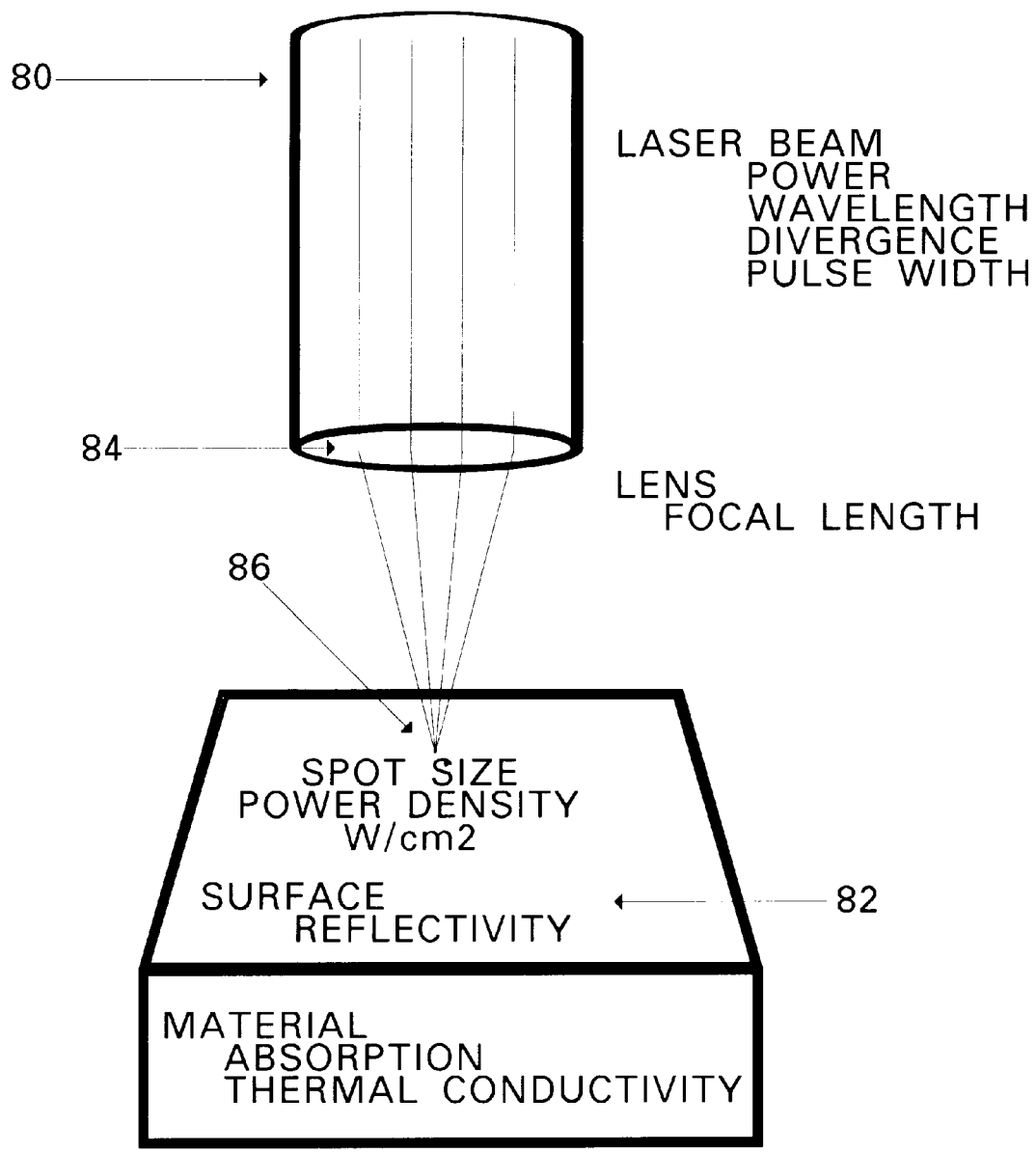
FIG. 3A shows a perspective view of laser beam affecting a surface with various laser processing variables detailed.

Referring now to FIG. 3A, a perspective view of a laser beam 80 is shown affecting an object surface 82, such as a brick, with various laser processing variables detailed. The laser beam 80 is generally affected by the following parameters: laser power, wavelength of the beam, divergence of the beam, and pulse width. The beam 80 passes through a lens 84 which focuses the beam at a certain distance depending upon the focal length of the lens. The beam is focused down to a spot size 80, which may be in the range of about 0.006"–0.009" (0.15–0.22 mm) diameter, but is not limited thereto. When using lasers in a useful range of about 60–250 watts, a power density or laser beam intensity in the range of about $1.6 \times 10^5$–$1.4 \times 10^6$ watts/cm$^2$ results. The affect the beam will have upon the surface of the object 82 will depend upon the reflectivity of the surface and the type of material making up the object.

Accordingly, different settings of the parts and parameters affecting the beam will similarly affect the beam's vitrification of a brick surface. Referring again, in part, to FIG. 2 a laser rail assembly for the preferred embodiment is shown. An aperture is generally included to narrow the beam. In the instant invention it has been found that an optimum beam can be achieved by using no aperture, e.g. utilizing the full beam width, and modifying the collimator, which normally functions to expand the beam within a range of 2x–8x, to produce an atypical beam expansion on the order of about 1.6x to 1.9x the generated beam width. This setting produces a relatively wide beam, but also produces a beam with a sufficient power density or laser beam intensity to vitrify bricks and other clay-based objects. By achieving the widest possible beam width with vitrifying power, the laser can vitrify a wider path with each pass over an object surface. The resultant increase in operating efficiency translates into a speed up of production and ultimately a reduction in costs for the laser marking business. While the above stated ranges of collimator, power density, aperture settings, and lens size define a particular embodiment, it is within the purview of this invention to use alternative groups of settings which serve an equivalent function.

Referring again to FIG. 3A, the material parameters affecting the process of vitrification include material absorption and thermal conductivity, as well as the aforementioned clay content of the object. A typical brick suited for vitrification includes a varied mixture of clay, sand, and grog. Grog is broken up pieces of brick that are placed back into the mix to manufacture new bricks. The general contents of a brick will vary in percentage per brick lots and brick colors. No specific brick from any particular manufacturer has been found to be more preferable over any other; the different bricks are susceptible to vitrification in varying degrees depending upon such things as the clay, sand, and grog content, and the overall color.

Figure 4:
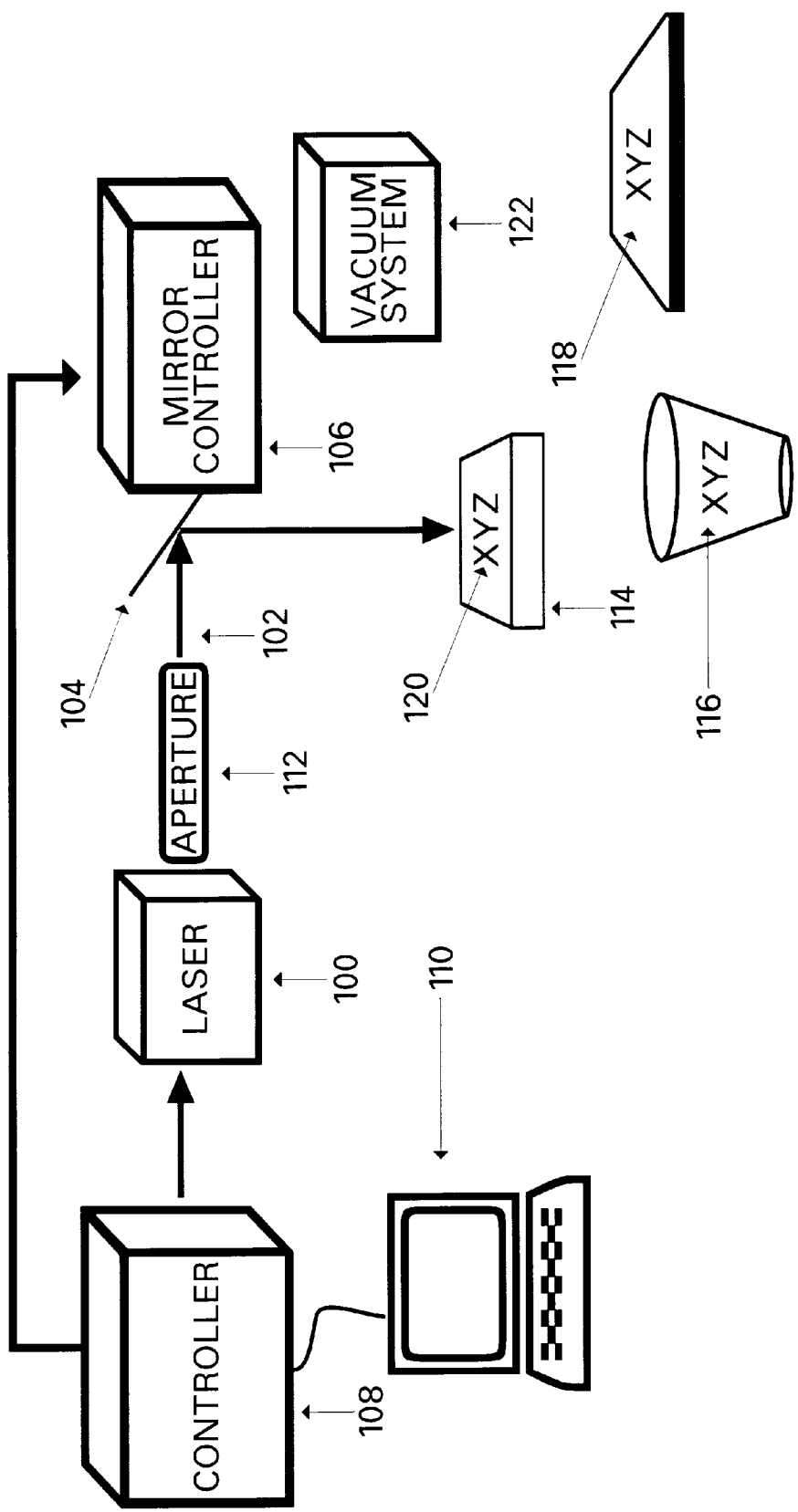
FIG. 4 shows block diagram of the laser marking system for the localized vitrification of vitrescent target objects.

Referring now to FIG. 4, a block diagram of the setup of the present invention is shown. The laser 100 is shown generating and projecting a beam 102 onto a steering mirror 104. The mirror, or pair of mirrors as per FIG. 3, are controlled via a positional control mechanism 106. The laser 100 and mirror controller 106 are connected to the controller 108, which is additionally connected to a computer processing means 110. The laser marking system is thereby controlled through the computer based system which directs and controls the laser with specialized software. The software provides a graphical user interface for the operator and requires the input of a form-program which describes the positioning points and the image being created. The program also prompts the user for the size, speed, and power of the laser. The information is converted to the appropriate language of the laser system and transmitted through associated transducers and controllers to operate the positioning galvanometers (See FIG. 3). The mirrors reflects the laser beam precisely to the work surface to create the image required.

There is no contact with the vitrescent object other than the energy transmitted from the beam. The beam can be turned on and off and it position, focus and intensity are controlled within specific tolerances. The specific settings for collimation and the aperture 112 are decided once the lens size is determined. Lens sizes of 160–300 mm are useful for the instant invention. The Collimator is used for focusing the beam and also for setting a zoom factor. The aperture is a device used to set the beam size. The final beam diameter at the work place is determined by multiplying the zoom factor times the aperture size. A vitrescent object such as a brick 114, a pot 116, or a tile 118 is then placed in the path of the reflected and steered beam 102. The computer 110 and controller 106 direct the beam 102 to from letter patterns 120, such as the "XYZ" pattern shown. A vacuum system 122 is also included to suction off gases, which might be harmful or unpleasant to the operator, away from the working area.

It is important, in order to achieve successful marking, to utilize vitrescent objects which have a reduced water content. The absorption characteristics of a brick may be determined in the following manner. Absorption is defined as the weight of water a brick unit absorbs, when immersed in either cold or boiling water for a stated length of time. This is expressed as a percentage of the weight of the dry unit. See ASTM Specification C 67. Absorption characteristics can be broken down into two distinct categories—total absorption and initial rate of absorption (IRA). Both are important in selecting the appropriate brick. Total absorption of a brick is expressed as a percentage, and defined as the ratio of the weight of water that is taken up into its body divided by the dry weight of the unit. Water absorption is measured in two ways: 1) submerging the test specimen in room temperature water for a period of 24 hours, and 2) submerging the test specimen in boiling water for five hours. These are known as the 24 hour cold water absorption, and the 5 hour boiling water absorption, respectively. These two are used to calculate the saturation coefficient by dividing the 24 hour cold water absorption by the 5 hour boiling. The saturation coefficient is used to help predict durability. In order to successfully and efficiently mark vitrescent objects, such as bricks, our tests have shown that the vitrescent object must be almost completely dry in order for the laser energy to completely melt and fuse the clay into homogeneous glass. When moisture is present, the laser energy for melting is lost converting water to steam. As the steam escapes through the molten glass, it causes bubbles to form. Moisture also sinks heat away from the surface causing poor penetration of the beam and resulting in very poor marking qualities.

The average moisture content of a high quality clay brick paver as received from commercial sources is approximately 2 to 8 percent by weight. Moisture can be acquired from rain, snow, condensation, factory applied water based sealants, etc. Moisture content must be reduced to about 0.75 percent or less to achieve optimum laser vitrification. Drying will also optimize the glass formation so as to produce a very smooth and glassy appearance of the marked area. This drying can be accomplished with post-drying by a kiln, oven or infra-red heat sources. When dry, most of the laser energy will be able to be used to vitrify the clay surface to glass and the remainder into heating the clay body. The best option and the one that produces optimum results, is to have a relatively dry and warm (100° F. or more) surface when attempting to glass vitrify a clay body. A cold clay body, e.g. room temp. or colder, acts as a heatsink, drawing the heat of the laser energy away from the marking area, and in turn heating the clay body. Pre-heating maximizes the amount of laser energy which can be utilized for localized melting rather than first warming the clay surface and then melting. This pre-warming can be accomplished with a batch warming oven or an infra-red heat source, etc.

In a particularly preferred embodiment of the invention, an oxygen gas assist is incorporated in the process in order to create an oxygen enriched atmosphere at the work surface. This may be accomplished by incorporating a gas supply manifold, (not shown) or any equivalent means of supplying oxygen to the work surface during laser vitrification. The inclusion of oxygen yields improvements in both marking quality and efficiency of the process, per se. While not wishing to be bound to any particular theories, it appears that the inclusion of oxygen increases the apparent beam intensity at the interface of the focal point of the laser beam and the clay body surface. This apparent increase in intensity provides more depth, width and visual appeal to the finished vitrified surface. These benefits are achieved with no penalty in marking speed, and in some cases, an increase in speed is possible. The oxygen can be introduced via flexible hoses and diffuser, which floods the surface of the clay body with a continuous stream or a custom fabricated delivery apparatus, such as a manifold for applying a constant laminar flow of oxygen across the work surface, can be made. Heating the gas, prior to delivery at the work surface, has also been shown to result in improved performance and efficiency.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. A method of marking a surface of a vitrescent object by vitrifying said surface utilizing a laser marking system comprising:

providing a means for producing a continuous wave laser beam selected from the group consisting of a Nd:Yag laser and a $CO_2$ laser having a laser beam width and a laser beam intensity, said laser beam producing means operating in a power range of 60–250 watts and including a collimator and a lens;

setting said collimator to produce a beam expansion within the range of about 1.6x–1.9x whereby an optimum width laser beam is produced having a laser beam intensity in the range of about $1.6 \times 10^5 - 1.4 \times 10^6$ watts/$cm^2$ for marking of said vitrescent object;

providing a means for steering said laser beam along a path, said steering means being configured for localized vitrification of a vitrescent object placed in said path of the laser beam, said steering means being computer controlled for producing lettering and graphical patterns on said vitrescent object;

placing said vitrescent object in a working area in said path of said beam;

programming said steering means to produce a desired image on said vitrescent object; and activating said beam and steering means to produce said desired image on said vitrescent object to thereby vitrify a portion of the surface thereof.

2. The method of marking a surface of a vitrescent object by vitrifying said surface utilizing a laser marking system according to claim 1, wherein:

said laser producing means is a continuous wave Nd:Yag laser.

3. The method of marking a surface of a vitrescent object by vitrifying said surface utilizing a laser marking system according to claim 1, wherein:

said laser producing means is a carbon dioxide laser.

4. The method of marking a surface of a vitrescent object by vitrifying said surface utilizing a laser marking system according to claim 1, wherein:

said laser beam steering means includes reflecting mirrors for reflecting said laser beam in X and Y coordinate directions, said reflecting mirrors being driven by computer controlled positional motors, said reflecting mirrors being used in conjunction with each other to control placement of said laser beam on said vitrescent object.

5. The method of marking a surface of a vitrescent object by vitrifying said surface utilizing a laser marking system according to claim 1, wherein:

said method further includes providing a vacuum system for removing gases produced by vitrifying said surface with said laser marking process.

6. The method of marking a surface of a vitrescent object by vitrifying said surface utilizing a laser marking system according to claim 1, wherein:

said method further includes providing an oxygen enriched atmosphere at said surface during vitrification;

whereby marking efficiency and appearance are enhanced.

7. The method of marking a surface of a vitrescent object by vitrifying said surface utilizing a laser marking system according to claim 1, wherein:

said method further includes heating the surface of the vitrescent object prior to vitrification to a temperature of about 100° F. or more;

whereby process efficiency and appearance are enhanced.

8. The method of marking a surface of a vitrescent object by vitrifying said surface utilizing a laser marking system according to claim 1, wherein:

said method further includes drying of the vitrescent object prior to vitrification so as to achieve a moisture content of up to about 0.75 percent;

whereby process efficiency and appearance are enhanced.

9. The method of marking a surface of a vitrescent object by vitrifying said surface utilizing a laser marking system according to claim 1, wherein:

said method further includes positioning of an aperture in series with the collimator;

whereby further control of the beam width is achieved.

10. The method of marking a surface of a vitrescent object by vitrifying said surface utilizing a laser marking system according to claim 1, wherein:

said lens has a diameter of about 160 mm–300 mm.

11. The method of marking a surface of a vitrescent object by vitrifying said surface utilizing a laser marking system according to claim 1, wherein:

said lens has a diameter of about 254 mm.

* * * * *